(12) United States Patent
Van Gerwen

(10) Patent No.: US 9,119,403 B2
(45) Date of Patent: Sep. 1, 2015

(54) MASS DISTRIBUTION DEVICE AND MOLDING DEVICE

(75) Inventor: Hendrikus Petrus Gerardus Van Gerwen, Someren (NL)

(73) Assignee: GEA FOOD SOLUTIONS BAKEL B.V., Bakel (NL)

( * ) Notice: Subject to any disclaimer, the term of this patent is extended or adjusted under 35 U.S.C. 154(b) by 0 days.

(21) Appl. No.: 13/883,152

(22) PCT Filed: Oct. 24, 2011

(86) PCT No.: PCT/EP2011/005345
§ 371 (c)(1),
(2), (4) Date: May 14, 2013

(87) PCT Pub. No.: WO2012/059188
PCT Pub. Date: May 10, 2012

(65) Prior Publication Data
US 2013/0224357 A1    Aug. 29, 2013

(30) Foreign Application Priority Data

Nov. 4, 2010 (EP) ...................................... 10014291

(51) Int. Cl.
*A22C 7/00* (2006.01)

(52) U.S. Cl.
CPC .............. *A22C 7/0092* (2013.01); *A22C 7/0069* (2013.01)

(58) Field of Classification Search
CPC ................................. A22C 7/00; A22C 7/0069
USPC ......... 425/197, 447, 449, 357, 362, 576, 575, 425/241; 426/513, 92, 280, 518, 646
See application file for complete search history.

(56) References Cited

U.S. PATENT DOCUMENTS

| | | | |
|---|---|---|---|
| 2,651,808 A * | 9/1953 | Burnett et al. | ................... 99/441 |
| 2,657,423 A | 11/1953 | Elsaesser | |
| 3,177,524 A | 4/1965 | Gause | |
| 3,205,837 A | 9/1965 | Fay | |
| 3,213,486 A | 10/1965 | Blake | |
| 3,347,176 A | 10/1967 | Hall | |
| 3,501,807 A * | 3/1970 | Hans-Werner | ........... 425/192 R |

(Continued)

FOREIGN PATENT DOCUMENTS

| | | |
|---|---|---|
| DE | 102006020361 A1 | 8/2007 |
| EP | 0818148 A1 | 1/1998 |

(Continued)

OTHER PUBLICATIONS

European Search Report Application No. EP10014291 Date Apr. 20, 2011.

(Continued)

*Primary Examiner* — Nahida Sultana
(74) *Attorney, Agent, or Firm* — The Dobrusin Law Firm, P.C.

(57) ABSTRACT

The present invention relates to an mass distribution device for supplying a mass of foodstuff starting material to one or more cavities of a mold drum for molding products from the mass, comprising a base member which extends partially around the outer cylindrical circumference of the drum and which has an introduction area through which the mass is the fed to the cavities. The invention further relates to a molding device and to a process for operating the inventive mass distribution device.

20 Claims, 6 Drawing Sheets

(56) References Cited

U.S. PATENT DOCUMENTS

| | | |
|---|---|---|
| 3,503,342 A | 3/1970 | Ilines |
| 3,724,026 A | 4/1973 | Gernandt |
| 3,727,308 A | 4/1973 | Ross |
| 3,750,232 A | 8/1973 | Holly |
| 3,823,633 A | 7/1974 | Ross |
| 3,856,680 A * | 12/1974 | Elmore .................. 210/184 |
| 3,991,440 A | 11/1976 | Hendrickson |
| 3,998,574 A | 12/1976 | Blake |
| 4,038,010 A * | 7/1977 | Bremer .................. 425/314 |
| 4,182,003 A | 1/1980 | Lamartino et al. |
| 4,212,609 A * | 7/1980 | Fay ....................... 425/100 |
| 4,272,864 A | 6/1981 | Holly |
| 4,338,702 A | 7/1982 | Holly |
| 4,356,595 A | 11/1982 | Sandberg et al. |
| 4,372,008 A | 2/1983 | Sandberg |
| 4,418,446 A | 12/1983 | Sandberg |
| 4,582,226 A | 4/1986 | Doak |
| 4,625,612 A | 12/1986 | Oliver |
| 4,630,425 A | 12/1986 | Reed |
| 4,630,426 A | 12/1986 | Gentry |
| 4,768,325 A | 9/1988 | Lindee et al. |
| 4,821,376 A | 4/1989 | Sandberg |
| 4,849,113 A * | 7/1989 | Hills ....................... 210/741 |
| 4,957,425 A * | 9/1990 | Fay ....................... 425/362 |
| 4,987,643 A | 1/1991 | Powers |
| 5,021,025 A | 6/1991 | Wagner |
| 5,102,238 A | 4/1992 | Contzen |
| 5,567,463 A | 10/1996 | Schaaf |
| 6,131,372 A | 10/2000 | Pruett |
| 6,368,092 B1 | 4/2002 | Lindee et al. |
| 6,371,278 B1 | 4/2002 | Hart et al. |
| 6,764,293 B2 | 7/2004 | Kashulines et al. |
| 2001/0022328 A1 | 9/2001 | Oh |
| 2002/0012731 A1* | 1/2002 | van Esbroeck et al. ....... 426/512 |
| 2002/0046696 A1 | 4/2002 | Lang |
| 2005/0013895 A1 | 1/2005 | Azzar |
| 2005/0042321 A1 | 2/2005 | LaBruno |
| 2005/0214399 A1 | 9/2005 | LaBruno et al. |
| 2005/0220932 A1* | 10/2005 | van der Eerden et al. ........ 426/1 |
| 2007/0098862 A1 | 5/2007 | Hansen et al. |
| 2007/0224305 A1 | 9/2007 | Meskendahl et al. |
| 2008/0202226 A1 | 8/2008 | Heim et al. |
| 2010/0196564 A1 | 8/2010 | Cepeda Mendoza et al. |
| 2011/0151082 A1 | 6/2011 | VanGerwen |
| 2012/0058213 A1 | 3/2012 | Lindee et al. |
| 2013/0045294 A1 | 2/2013 | Van Gerwen et al. |
| 2013/0164403 A1 | 6/2013 | Boogers et al. |
| 2013/0224357 A1 | 8/2013 | Van Gerwen |
| 2013/0273192 A1 | 10/2013 | Van Gerwen |
| 2013/0291483 A1 | 11/2013 | Van Gerwen |
| 2014/0037811 A1 | 2/2014 | Colosimo |

FOREIGN PATENT DOCUMENTS

| | | |
|---|---|---|
| EP | 1520480 A1 | 4/2005 |
| EP | 1920847 A1 | 5/2008 |
| EP | 2064956 A1 | 6/2009 |
| EP | 2595489 A1 | 1/2012 |
| FR | 2387609 A1 | 11/1978 |
| GB | 1015820 A | 1/1966 |
| GB | 2312641 A | 11/1997 |
| JP | 56-001868 A | 1/1981 |
| JP | 03-108471 | 5/1991 |
| JP | 10-058463 A1 | 3/1998 |
| JP | 2001299317 A | 10/2001 |
| JP | 2005-530514 A | 10/2005 |
| WO | 88/07003 A1 | 9/1988 |
| WO | 96/09210 A1 | 3/1996 |
| WO | 2004/002229 A2 | 1/2004 |
| WO | 2005/009696 A1 | 2/2005 |
| WO | 2005/107481 | 11/2005 |
| WO | 2006/020139 A1 | 2/2006 |
| WO | 2008/091634 A2 | 7/2008 |
| WO | 2010/110655 A1 | 9/2010 |
| WO | 2012/012581 A1 | 1/2012 |
| WO | 2012/055454 A2 | 5/2012 |
| WO | 2012/107236 A2 | 8/2012 |

OTHER PUBLICATIONS

International Search Report and Written Opinion PCT/EP2011/005345, dated Jan. 25, 2012.
International Preliminary Report PCT/EP2011/005345, dated Nov. 30 2012.
Potentially related Application, U.S. Appl. No. 13/944,973 Published as 2013/0273192, Oct. 17, 2013.
Potentially related Application, U.S. Appl. No. 13/980,778 Published as 2013/0291483, Nov. 7, 2013.
Potentially related Application U.S. Appl. No. 13/982,377 Published as WO2012/107236, Aug. 16, 2012.
Notice of Allowance, U.S. Appl. No. 14/269,465 dated Jan. 26, 2015.
Priority Application, U.S. Appl. No. 61/366,033.
Third Party Observation Document filed for EP Application No. 10014291.8 dated Mar. 13, 2015.
Japanese Office Action, Application No. 2013-537024 dated May 29, 2015.

* cited by examiner

MASS DISTRIBUTION DEVICE AND MOLDING DEVICE

The present invention relates to a mass distribution device for supplying a mass of foodstuff starting material to one or more cavities of a mold drum for molding products from the mass, the device comprising a base member which extends partially around the outer cylindrical circumference of the drum. The base member has an introduction area through which the mass is the fed to the cavities. The invention further relates to a molding device and to a process for operating the inventive mass distribution device.

Mass distribution devices for supplying a mass of foodstuff starting material to one or more cavities are known to the person skilled in the art, for example from WO 2010/110655. These devices have, however, the deficiency that especially products with fibers, for example turkey, tend to orient themselves in the direction of the product flow; i.e. in case of a drum, the fibers will orient themselves in the turning direction of the drum. During cooking, these fibers will shrink in their length direction and thus deform the product for example from a round into an oval shape, which is not desired.

It was therefore the objective of the present invention to provide a mass distribution device, which does not have the deficiencies of the devices according to the state of the art.

This problem is attained with a mass distribution device for supplying a mass of foodstuff starting material to one or more cavities of a mould drum for molding products from the mass, comprising a base member which extends partially around the outer cylindrical circumference of the drum and which has an introduction area through which the mass is fed to the cavities, whereas the base member comprises in the introduction area a multitude of holes through which the mass is pressed into the cavities.

The present invention is related to mass distribution device for supplying a mass of foodstuff starting material. This mass is especially a meat mass, for example from beef, turkey or the like. This mass is pressed into one or more cavities of a rotating mould drum and formed into products, especially patties.

The mass distribution device according to the present invention comprises a base member, which extends at least partially around the outer cylindrical circumference of the drum. This base member comprises an introduction area through which the mass is fed into the cavities of the mould drum. This drum rotates continuously or intermittently. According to the present invention, the base member now comprises in the introduction area a multitude of holes through which the mass is pressed into the cavities. The base member can be made from metal or plastic, whereas metal is preferred.

Due to these holes, the mass is not oriented in the formed products and thus, in case shrinkage occurs during cooking, the product shrinks uniformly. The base member can be made from metal or plastic, whereas metal is preferred.

Preferably, the base member comprises an array of holes per cavity. Preferably, the holes in the array are distributed equidistantly. The holes can have any cross section known to the person skilled in the art, whereas round holes, or holes with a rectangular or square cross-section are preferred. These round holes are preferably drilled into the base member. The holes can have a uniform cross section over their entire length. In another preferred embodiment, holes are tapered from their inflow to their outflow or the other way round. Each hole can be partially tapered and can comprise partially a uniform cross section. Preferably the edge of each hole at the inlet and/or the outlet is at least partially not rounded but sharp in order to facilitate a cutting.

Preferably the holes in the base ember are only arranged in the area of the cavity below, i.e. the array of holes has essentially the same shape as the cross section of the cavity below. This preferred embodiment has the advantage, that leakage of meat mass between the surface of the drum and the base member is reduced.

In another preferred embodiment, the holes in the base member extend essentially over its entire width. This embodiment has the advantage that the base member is suitable for a multitude of differently shaped cavities.

The drum can rotate and/or be stationary while it is filled. In the first case it can be desirable the extension of the rows in the base member in the direction parallel to the direction of rotation of the drum is smaller than the dimension of the cavities parallel to the direction of rotation of the drum. In case the drum rotates while the cavities are filled with mass, in principal only one row of holes in the base member is needed. The cavities move past this row and are filled during their motion. However it can be desirable to have one or more rows of holes in the base member.

The holes in the base member may have all the same length and/or the same cross section. However the holes can also vary in length and/or in their cross section. In case that the holes differ in length, it is preferred that the cross section increases with increasing length of the holes, so that the holes all comprise preferably the same flow resistance.

Preferably, the base member is provided exchangeable, so that, for example, a suitable base member can be chosen for the respective meat and/or mold.

Preferably, the base member is made of several parts. More preferably, each array of holes or the arrays of holes per row is/are provided as a separate part, preferably as an inlay which can be attached to the base member, so that, for example, a suitable array of holes can be chosen for the respective meat and/or mold.

In a preferred embodiment, especially in case the mass comprises fibers, it is preferred that the inventive mass distribution device comprises a cutting member in the introduction area, adjacent to the base member that cooperates cuttingly with the base member, specifically to cut the fibers of the mass. Preferably, this cutting member is made from metal, especially steel. In a preferred embodiment, the cutting member comprises an array of holes per cavity, whose holes are, more preferably, arranged as the holes in the corresponding array in the base member. While the edges of the cutting member at the mass entry may be rounded, it is preferred that the edges of the holes of the cutting member at the interface to the base member are sharp so that they can cooperate in a cutting manner with the edges of the holes in the base member. The cross section of the holes in the base member may be identical to the cross section of the holes in the base member. However, in a preferred embodiment, the cross section of the holes in the cutting member differs from the cross section of the holes in the base member in its size and/or in its shape.

Preferably, the cutting member is provided exchangeable, so that, for example, a suitable cutting member can be chosen for the respective meat and/or mold.

Preferably, the cutting member is made of several parts. More preferably, each array of holes or the arrays of holes per row is/are provided as a separate part, preferably as an inlay which can be attached to the cutting member, so that, for example, a suitable array of holes can be chosen for the respective meat and/or mold.

Preferably, the mass distribution device comprises movement means, which are utilized to slide the cutting member relative to the base member and thus achieve the cutting of the mass. Preferably, the cutting member is reciprocated between two positions.

Preferably, the cutting member is a flat or curved plate.

In case that the base member comprises inserts, these inserts are preferably pressed against the drum by a pressure element, for example a spring, or an adjustable pressure element, so that the pressing force of the insert against the drum can be selected.

In a preferred embodiment, the mass distribution device comprises a housing. This housing and/or the base member define a fill chamber, into which the mass is pressed, for example by a pump or by a screw, before it is forced through the holes in the introduction area of the base member and then into the cavity. Preferably, in this fill chamber, one or more inserts are located, which hold, preferably press the cutting member against the base member in order to avoid that mass flows between the cutting member and the base member.

In the fill area, preferably at the base member and even more preferably at the inserts of the base member, splitting means, especially a knife can be provided, in order to, for example, split the meat mass flow and/or avoid bridge forming of the meat mass. The splitting means can be provided uniformly with the insert or as a separate piece that is attached to the insert.

In a preferred embodiment, the cutting member is not only utilized to cut the mass but also as a valve in order to increase the flow resistance of the mass distribution device. This can be achieved by at least partially covering the entry area of the holes in the base member by the cutting member. In a preferred embodiment, after the filling of the cavities is completed, the cutting member covers the entry area of the base member at least essentially entirely in order to avoid that the mass in the cavities is further compressed and/or to avoid supercharge of the cavities.

In a preferred embodiment, the mass distribution device comprises a pressure member, which is located at the inside of the base member; i.e. at the side, which faces the drum. The pressure member is at least partially in contact with the circumferential surface of the drum. More preferably, the pressure plate is pressed against the circumferential surface of the drum. This pressure member is primarily utilized to avoid mass-leakage out of the filling area of the drum. Preferably, one pressure member is located upstream and one pressure member downstream of the filling area of the drum. The pressure member downstream of the drum can also be utilized to maintain a certain pressure in the cavity of the drum after it has been filled with mass. The pressure member is preferably a plate, preferably a bent plate, more preferably a flexible bent plate, which is preferably made from plastic and which even more preferred comprises grooves for the pressure elements and/or the seals.

In a preferred embodiment, the device comprises at least one pressure element and/or at least one seal, which are located between the base member and the pressure member. The seal assures that no mass is leaked out of the filling area and preferably presses the pressure member against the drum. The pressure elements press the pressure member against the drum. The pressure members can be, for example, an O-rings.

In a preferred embodiment, the pressure elements and/or the seal elements are adjustable in their size in order to increase or decrease their sealing- or the pressing-ability. In a preferred embodiment, the pressure- and/or seal elements are hollow O-rings, which can be filled with a medium, for example air or water, and which can be reversibly extended depending on their inside pressure. The person skilled in the art understands that the sealing or the pressure effect can be utilized by the same element.

The inventive mass distribution system is especially suitable for a moulding device.

Another subject matter of the present invention is therefore a moulding device for molding products from a mass of foodstuff starting material, comprising a mould drum, which can be displaced in a direction of movement by drive means, which comprises at its outer cylindrical circumference at least one cavity and a mass distribution device according to the present invention, for distributing the mass over one or more cavities.

Another subject matter of the present invention is a process for operating the mass distribution device according to the present invention, whereas the cutting member cuts the mass at least once during and/or after the filling of a cavity.

The cutting servers preferably the purpose to prevent the holes in the introduction area from clogging.

If the mass, especially the fibers are not cut sufficiently, it is preferred to cut the mass several times, by for example, making several strokes with the cutting member after the filling of one row is completed and before the filling of the next row starts. On the other hand, it may be preferable to make only one stroke after the filling of two or more rows, for example one stroke after the fill of three, four, five or more rows of cavities. This preferred embodiment of the present invention reduces the loss of structure of the meat.

In a preferred embodiment, the pressure of the mass of foodstuff starting material is reduced before during and/or after the movement of the cutting member.

Another subject matter of the present invention is a process for operating the mass distribution device according to the present invention, whereas the cutting member is utilized as a valve for the mass during and/or after the filling of a cavity.

The disclosure made to the mass distribution device is also applicable to the other subject matters of the present invention and vice versa.

The invention is now explained in further detail according to FIGS. 1-8. These explanations do not limit the scope of protection. The explanations apply to all subject matters of the present invention, likewise.

Figure 1A:
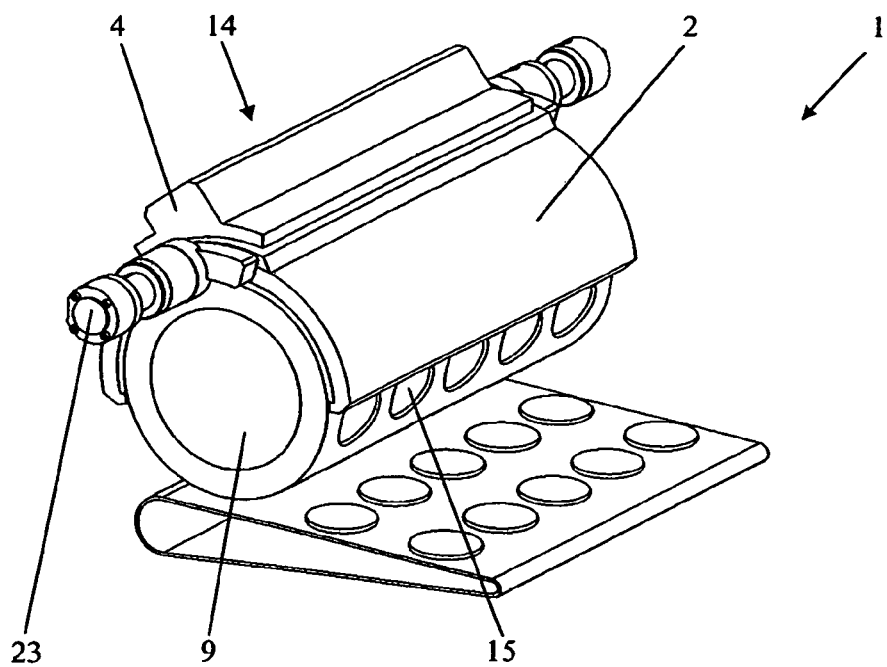
FIG. 1 shows the inventive molding device with a first embodiment of the inventive mass distribution device.
Figure 1B:
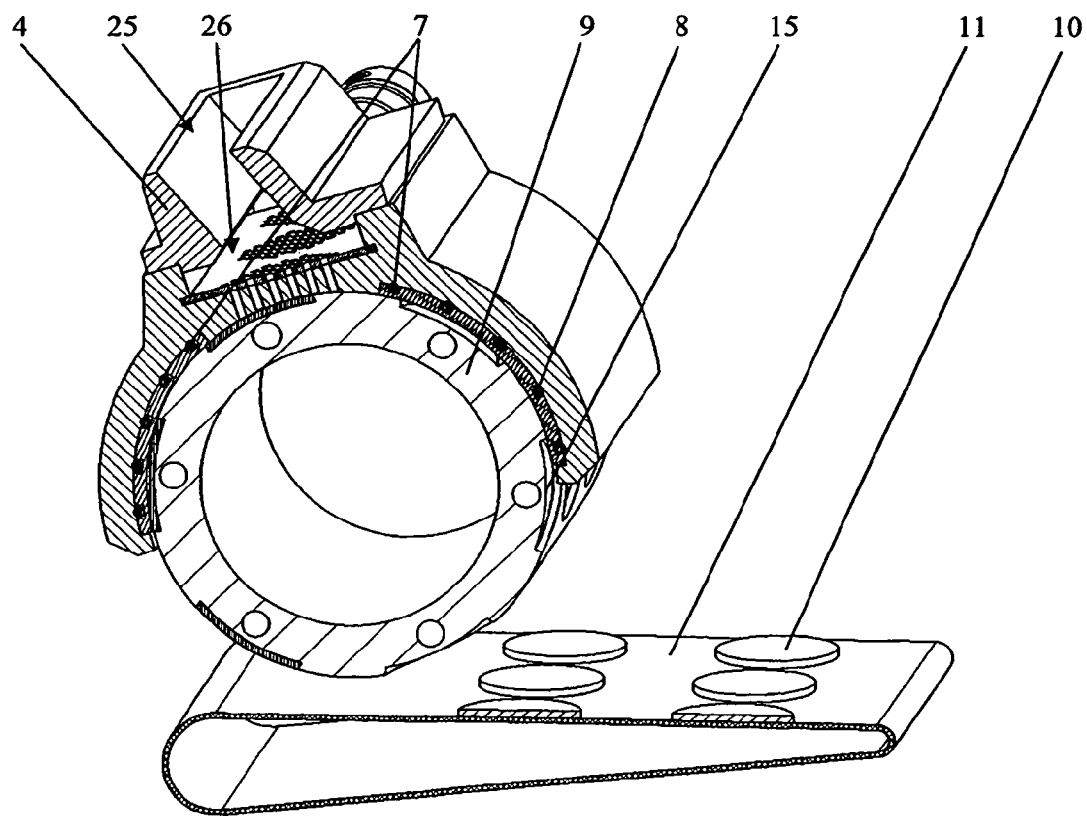
Figure 1C:
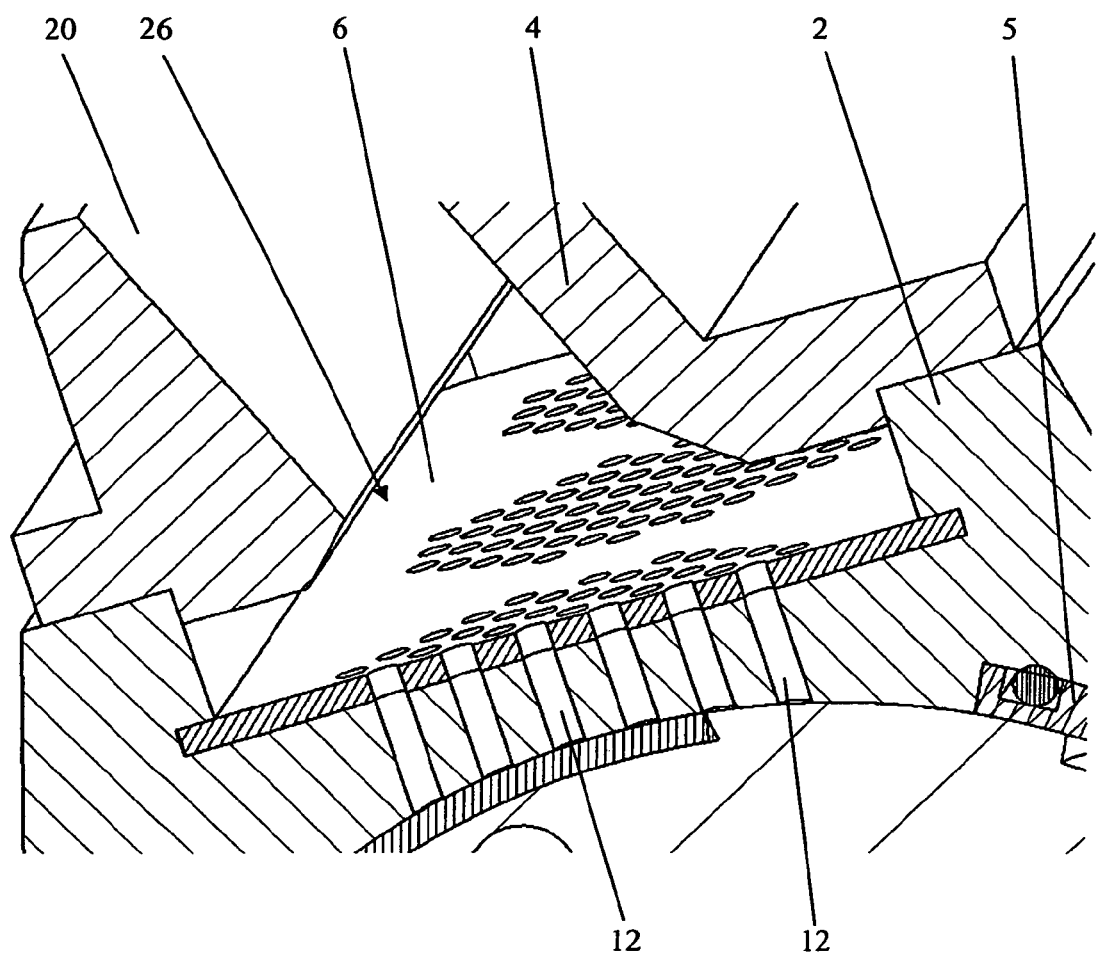

FIGS. 1a-1c show a first embodiment of the inventive molding device with the inventive mass distribution device. The molding device 1 comprises a rotating drum, in the present case a counter-clockwise rotating drum, which comprises at its outer circumferential diameter a multitude of rows of cavities 15. In the present case, each row comprises five cavities, which are filled and emptied simultaneously. The cavities 15 are filled with a food mass, especially with a meat mass, while the drum is rotating and the formed products are discharged on a discharge belt 11, which transports the formed products 10, here patties, away from the inventive molding device. For filling of the cavities 15 with the mass, the inventive mass distribution device 14 is utilized. This device comprises a base member 2, here a base plate, which covers the outer circumference of the drum partially. This base member can be made from metal or plastic. The base member comprises, here at its center, an introduction area 26, through which the mass is forced into the cavities 15. According to the present invention, as can be especially seen from FIG. 1c, the base member 2 comprises in this introduction area 26 a multitude of holes, which are in the present case arranged to an array of holes. The introduction area preferably comprises a multitude of arrays of holes, which are each in alignment with a cavity. Since one surface of the base member is flat and one is round, the holes differ in length. In the center the holes are shorter than at the rim of the array. The holes are in the present case cylindrical and arranged equidistantly and have all the same diameter, which is uniform over its entire length. Since the introduction area 26 is, in the present case, flat, and the side of the base member facing the drum is round, the holes differ partially in length. Directly adjacent to the base member 2, in the introduction area, the inventive molding device comprises a cutting member 6, here a cutting plate. This cutting member also comprises an array of holes. The cutting member is provided slideable as depicted by the double-arrow in FIG. 1c. During this sliding action, a cutting at the interface between cutting member 6 and the top of the base member 2 takes place in order to cut, for example fibers in the mass. The movement of the cutting member 2 is utilized by motor means 23, which push the cutting plate 6 back and forth preferably once during and/or after filling of a row of cavities. The cutting member 6 cannot only be utilized to cut the mass but also as a valve, which increases/decreases the flow resistance of the molding device by covering at least partially the holes 12 in the base member 2 by means of the cutting member 6. The inventive molding device preferably comprises a housing 4, which is connected to a mass feed member, for example a pump or a screw, which fills the mass into a fill chamber 20, defined by the housing 4 and/or the base member 2.

Figure 2:
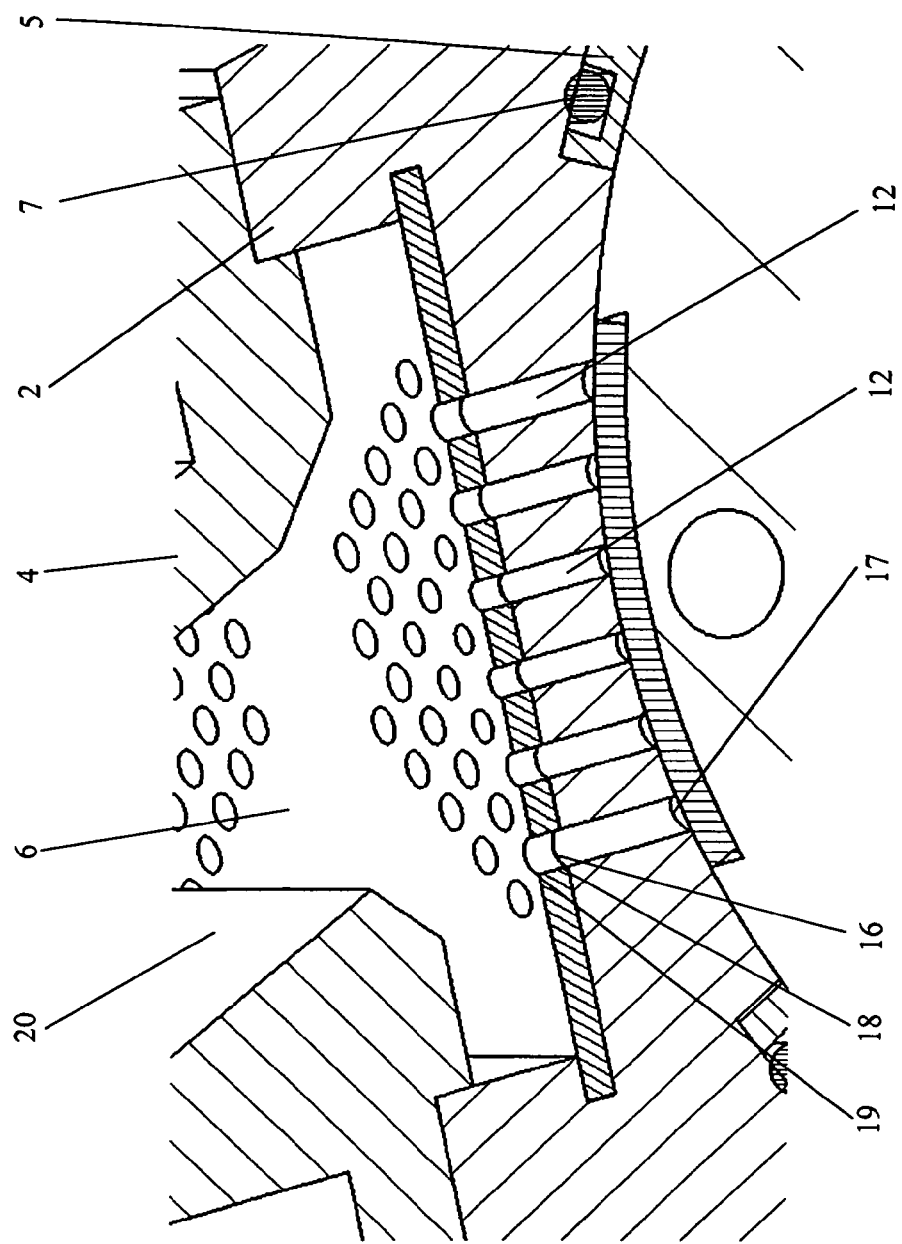
FIG. 2 shows a second embodiment of the inventive mass distribution device.

FIG. 2 shows a second embodiment of the molding device. Essentially, reference can be made to the disclosure according to FIG. 1c. However, in the present case, the diameter of the holes 12 differ such that holes with an increasing length comprise an increased diameter in order to assure that the flow resistance of all holes 12 is essentially the same. I the center, the diameter of holes 12 is smaller than at the rim. The diameter is in the present case uniform over the entire length of the holes.

Figure 3:
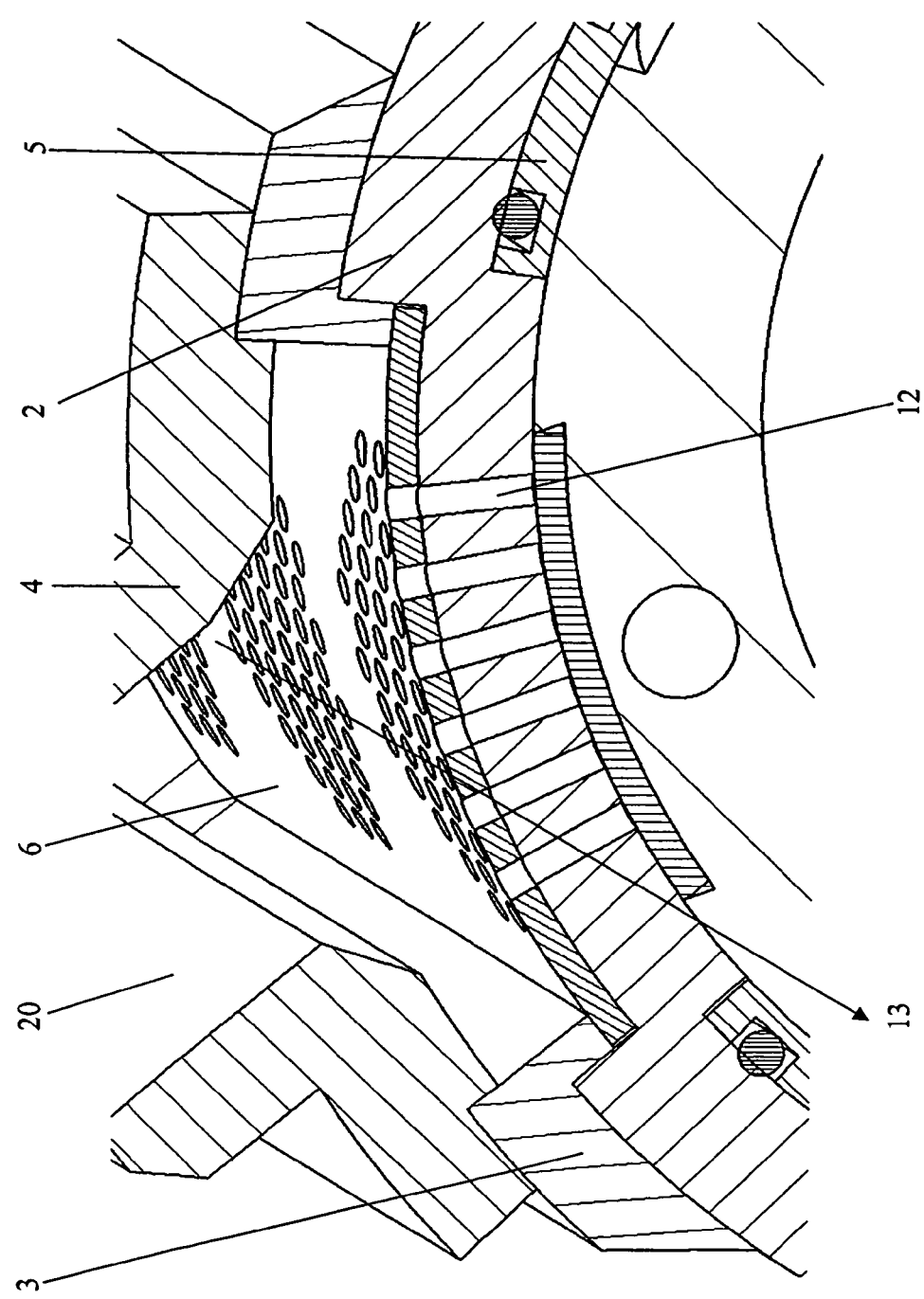
FIG. 3 shows a third embodiment of the inventive mass distribution device.

FIG. 3 shows yet another embodiment of the molding device. Again, essentially reference can be made to the disclosure according to FIGS. 1c and 2. However, in the present case, the introduction area 26 of base member 2 and thus the cutting member 6 are bent, so that all holes 12 have preferably the same length and the same diameter, which is, in the present case, uniform over the entire length of the holes.

Figure 4B:
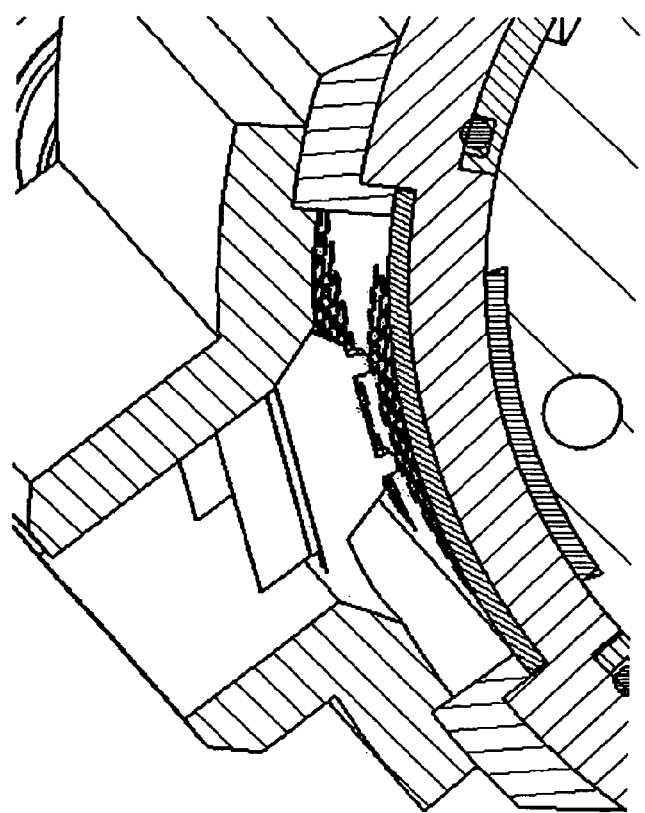
FIG. 4 shows details of the fill chamber.
Figure 4A:
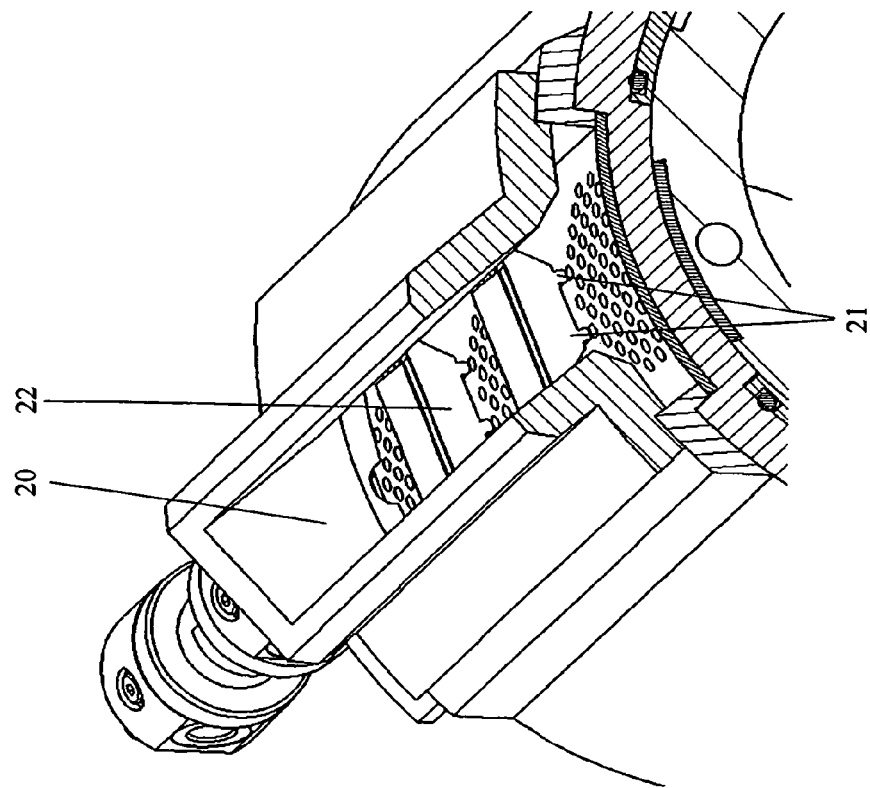

FIGS. 4a and b show details of the fill chamber 20. This fill chamber 20 comprises here two inserts 22 with a contact area 21 at their bottom. This contact area is in contact with the cutting member 6 and holds the cutting member down, especially presses the cutting member against the base member in order to avoid mass leakage between the cutting member 6 and the base member 2.

Figure 6:
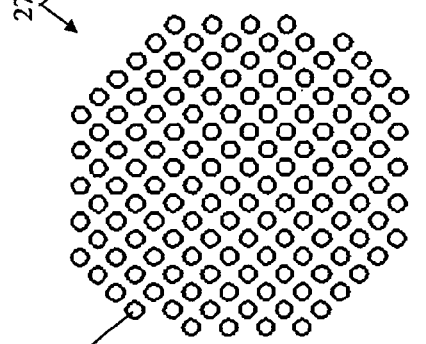
Figure 6:
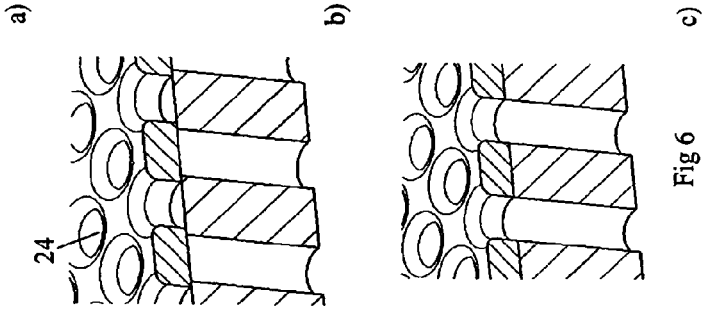
Figure 5:
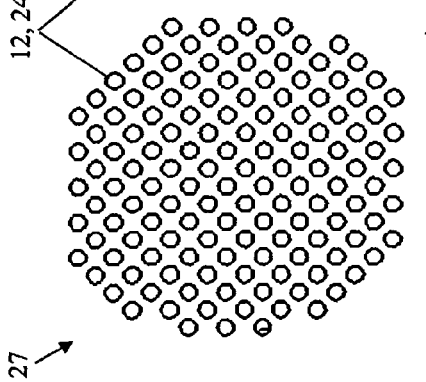
Figure 5:
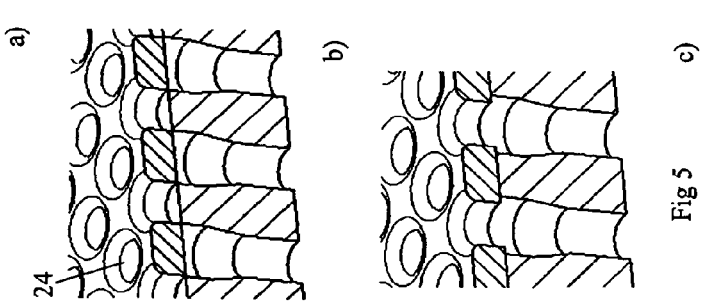

FIGS. 5-8 show different embodiments of the holes 12 in the base member and/or holes 24 in the cutting member 6. As can be seen from FIGS. 5a-8a, all holes are arranged to an array per cavity. The holes 24 in the cutting member are arranged in the same array as the holes 12 in the base member, even though they can differ in size and/or in the shape of the cross section. The holes in one are provided equidistantly. FIG. 5 shows an embodiment where the holes in the base member are tapered from the top to the bottom. FIG. 6 an embodiment with cylindrical holes 12 in the base member.

Figure 8:
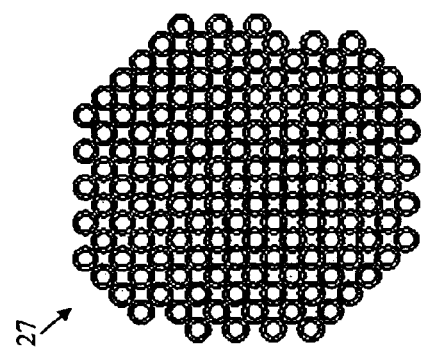
FIGS. 5-8 show different arrays of holes with different cross sections.
Figure 8:
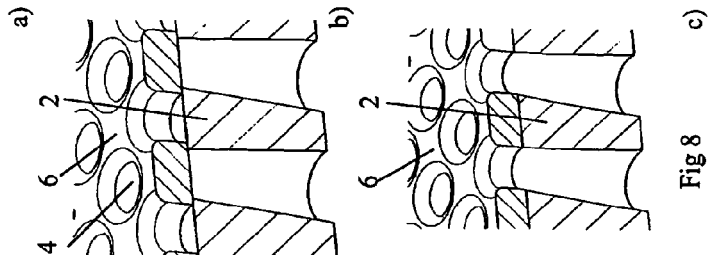
Figure 7:
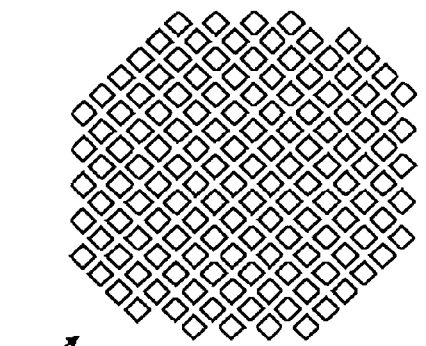
Figure 7:
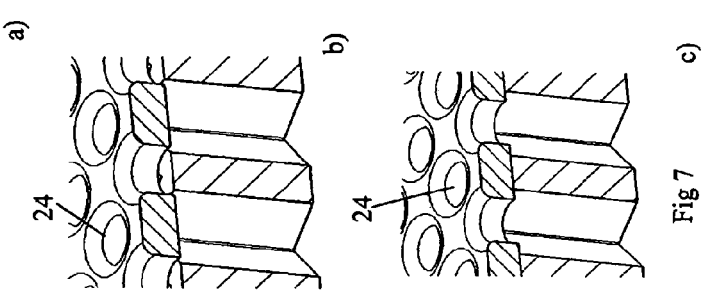

FIG. 7 shows an embodiment with rectangular or square holes 12 in the base member. FIG. 8 shows an embodiment with widening holes from the top to the bottom. FIGS. 5b-8b show the cutting member 6 and the base member 2 during the cutting action. The sharp edges of the holes 24 in the cutting member cooperate during cutting with the adjacent edges of the holes 12 in the base member in a scissor-like-manner. As can be also seen from FIGS. 5b-8b, the holes 12 are entirely covered by the cutting member after the cutting is completed, so that they function as a valve, which, in the present case, entirely stops the flow of the mass. FIGS. 5c-8c show the cutting member 6 in its home position. In this case, holes 24 in the cutting member are aligned with the holes 12 in the base member so that the inventive molding device provides least flow resistance.

LIST OF REFERENCE SIGNS

1 Food product forming apparatus, molding device
2 Base member, base member
3 Fixation means for the cutting member
4 housing
5 pressure member, pressure plate
6 cutting member, cutting plate
7 seal, seal around introduction area, spring element, O-ring
8 pressure element, spring element, O-ring
9 Drum, mould drum
10 molded product
11 Transportation means, belt
12 Hole in base-plate
13 Movement direction of the cutting member
14 Mass distribution device
15 cavity
16 cutting edge of the hole in the base member adjacent to the cutting plate
17 cutting edge of the hole in the base member adjacent to the drum
18 cutting edge at the cutting member
19 side of the cutting plate facing a fill chamber
20 fill chamber
21 contact area
22 insert
23 movement means for the cutting plate
24 hole in the cutting member
25 introduction opening
26 introduction area of the base member
27 array of holes

The invention claimed is:

1. A mass distribution on device comprising:
a base member having a first surface, wherein the first surface has a shape capable of extending partially around an outer cylindrical circumference of a cylinder, and having introduction area capable of feeding a mass of foodstuff starting material through,
wherein the base member comprises in the introduction area a multitude of holes through which the mass is forced through and pressed into the cavities so that the mass distribution device is capable of supplying the mass of food stuff to a cavity or a plurality of cavities of an outer cylindrical surface of a mould drum for molding products from the mass;
wherein the device includes slidable cutting member located in the introduction area which cooperates with the base member to cut the mass of foodstuff; wherein the mass distribution device includes a housing and the base member and the housing define a fill chamber in which an insert is located, wherein the insert holds the cutting member against the base member.

2. The mass distribution device according to claim 1, wherein the multitude of holes of the base member comprises one or more arrays of holes, wherein each array of holes is capable of filling one of the one or more cavities.

3. The mass distribution device according to claim 1, wherein the holes of the introduction area include adjacent holes differing in length.

4. A mass distribution device comprising:
a base member having a first surface, wherein the first surface has a shape capable of extending partially around an outer cylindrical circumference of a cylinder, and having an introduction area capable of feeding, a mass of foodstuff starting material through, wherein the base member comprises in the introduction area a multitude of holes through which the mass is forced through and pressed into the cavities so that the mass distribution device is capable of supplying the mass of food stuff to a cavity or a plurality of cavities of an outer cylindrical surface of a mould drum for molding products from the mass;
wherein a pressure member is located at an inside of the base member: and at least one pressure element and/or at least one seal element, is located between the base member and the pressure member.

5. The mass distribution device according to claim 1, wherein the cutting member comprises holes, arranged according to the same array as the holes in the base member.

6. The mass distribution device according to claim 1, wherein the mass distribution device comprises movement means to slide the cutting member.

7. The mass distribution device according to claim 1, wherein the cutting member is a curved plate.

8. The mass is distribution device according claim 1, wherein the mass distribution device comprises a housing.

9. A mass distribution device according to claim 1, wherein a pressure member is located at an inside of the base member.

10. The mass distribution device according to claim 4, wherein the device includes a slidable cutting member located in the introduction area, which cooperates with the base member to cut the mass of foodstuff.

11. The mass distribution device according to claim 4, wherein the pressure member is a bent plate made from plastic and includes a groove for the at least one pressure element and/or the at least one seal elements.

12. The mass distribution device according to claim 4, wherein the at least one pressure elements are adjustable to increase or decrease the pressure effect, and/or the at least one seal elements are adjustable to increase or decrease the sealing effect.

13. A moulding device for molding products from a mass of foodstuff starting material, comprising:
a mould drum, which can be displaced in a direction of movement by drive means, which comprises at its outer cylindrical circumference one or more cavities and
a mass distribution device for distributing the mass of foodstuff starting material to the one or more cavities of the drum for molding products from the mass; the mass distribution device comprising:
a base member which extends partially around an outer cylindrical circumference of the drum and which has an introduction area through which the mass is fed to the cavities,
wherein the base member comprises in the introduction area a multitude of holes through which the mass is forced through and pressed into the cavities; and
the mass distribution device includes a slidable cutting member located in the introduction area which cooperates with the base member to cut fibers in the mass of foodstuff; wherein the mass distribution device includes a housing and the base member and the housing define a fill chamber in which an insert is located, wherein the insert holds the cutting member against the base member.

14. The mass distribution device according to claim 2, wherein the multitude of holes of the base member includes adjacent holes differing in length.

15. The mass distribution device according to claim 11, wherein the device includes a slidable cutting member located in the introduction area which cooperates with the base member to cut fibers in the mass of foodstuff.

16. The mass distribution device according to claim 6, wherein the cutting member comprises holes, arranged according to the same array as the holes in the base member.

17. The mass distribution device according to claim 16, wherein the cutting member is a flat or curved plate, and the cutting member comprises a housing.

18. The mass distribution device according to claim 17, wherein the base member and/or the housing define a fill chamber in which an insert is located that holds the cutting member against the base member.

19. The mass distribution device according to claim 18, wherein a pressure member is located at an inside of the base member.

20. The moulding device of claim 13, wherein each of the multitude of holes has an edge adjacent to the mould drum.

* * * * *

UNITED STATES PATENT AND TRADEMARK OFFICE
CERTIFICATE OF CORRECTION

PATENT NO. : 9,119,403 B2
APPLICATION NO. : 13/883152
DATED : September 1, 2015
INVENTOR(S) : Hendrikus Petrus Gerardus Van Gerwen It is certified that error appears in the above-identified patent and that said Letters Patent is hereby corrected as shown below:

In the claims

Claim 1 Column 6, Line 50 to Column 7, Line 2, replace the claim with:
"1. A mass distribution device comprising:
a base member having a first surface, wherein the first surface has a shape capable of extending partially around an outer cylindrical circumference of a cylinder, and having an introduction area capable of feeding a mass of foodstuff starting material through,
wherein the base member comprises in the introduction area a multitude of holes through which the mass is forced through and pressed into the cavities so that the mass distribution device is capable of supplying the mass of food stuff to a cavity or a plurality of cavities of an outer cylindrical surface of a mould drum for molding products from the mass;
wherein the base member includes a pressure member for avoiding leakage of the mass out of a filling area of the mould drum, wherein the pressure member presses a pressure element against the mould drum;
wherein the device includes a slidable cutting member located in the introduction area which cooperates with the base member to cut the mass of foodstuff, wherein the cutting member is a valve for increasing the flow resistance of the mass."

Claim 13 Column 8, Line 4 to Line 26, replace the claim with:
"13. A moulding device for molding products from a mass of foodstuff starting material, comprising:
a mould drum, which can be displaced in a direction of movement by drive means, which comprises at its outer cylindrical circumference one or more cavities and
a mass distribution device for distributing the mass of foodstuff starting material to the one or more cavities of the drum for molding products from the mass; the mass distribution device comprising:
a base member which extends partially around an outer cylindrical circumference of the drum and which has an introduction area through which the mass is fed to the cavities,
wherein the base member comprises in the introduction area a multitude of holes through which the mass is forced through and pressed into the cavities; and
the mass distribution device includes a pressure member is located at an inside of the base member;

Signed and Sealed this
First Day of March, 2016

Michelle K. Lee
*Director of the United States Patent and Trademark Office* and at least one pressure element and/or at least one seal element, is located between the base member and the pressure member."

Claim 19 Column 8, Line 44 to Line 46, replace the claim with:
"19. The mass distribution device according to claim 18, wherein the pressure member is located at an inside of the base member."

Claim 20 Column 8, Line 47 to Line 48, replace the claim with:
"20. The moulding device of claim 13, wherein the mass distribution device includes a slidable cutting member located in the introduction area which cooperates with the base member to cut fibers in the mass of foodstuff; and each of the multitude of holes has an edge adjacent to the mould drum."